United States Patent Office 3,564,064
Patented Feb. 16, 1971

3,564,064
PROCESS FOR MANUFACTURING
TRIFLUOROETHYLENE
Shinichi Nakagawa, Settsu-shi, Japan, assignor to Daikin
   Kogyo Kabushiki Kaisha, Asaka-shi, Japan
No Drawing. Filed Dec. 15, 1967, Ser. No. 690,797
Claims priority, application Japan, Dec. 16, 1966,
41/82,564
Int. Cl. C07c 17/00, 21/18
U.S. Cl. 260—653.5                             5 Claims

ABSTRACT OF THE DISCLOSURE

A process for manufacturing trifluoroethylene from trifluorochloroethylene, which comprises introducing a gas-phase mixture of hydrogen and trifluorochloroethylene in a mole ratio of $H_2$ to $CClF=CF_2$ between 0.8:1 and 1.2:1 into a reaction zone to bring the mixture into contact with a palladium or platinum catalyst maintained at 200 to 320° C. for 0.1 to 4.0 seconds, and recovering $CHF=CF_2$ from the resulting reaction products.

---

This invention relates to a process for manufacturing trifluoroethylene ($CHF=CF_2$) which is useful as a monomer, and more particularly to catalytic gas-phase reaction of trifluorochloroethylene ($CClF=CF_2$) and hydrogen to trifluoroethylene.

Various proposals for producing unsaturated fluorohydrocarbons by reaction of fluorochlorocarbons and hydrogen have been made. According to the known methods, however, conversion rate of the starting organic compounds is generally poor, and when it is intended to increase the conversion rate a considerable amount of undesired byproducts is produced, reducing yield rate of the desired products.

In U.S. Pat. No. 2,802,887 there is disclosed that trifluoroethylene is produced with minimum production of byproduct, trifluoroethane ($CH_2FCHF_2$), by contacting a 0.4–0.75:1 molar mixture of hydrogen and trifluorochloroethylene with palladium catalyst at 90–150° C. for 5–25 seconds. Even by such method, however, it is not possible to produce trifluoroethylene in high yield with high conversion of trifluorochloroethylene starting material. In fact it is difficult to produce the desired trifluoroethylene in a yield of higher than 80 mole percent with a conversion of higher than 65 mole percent of the starting trifluorochloroethylene.

The main object of the invention is to provide a process for the manufacture of trifluoroethylene selectively from trifluorochloroethylene in a high yield with a high conversion of the starting trifluorochloroethylene.

Other objects and specific features of the invention will become apparent in view of the following:

According to the investigations of the present inventor, it has been found that high conversion of the starting trifluorochloroethylene as well as high yield of the desired trifluoroethylene are largely dependent upon the reaction conditions, i.e., reaction temperature, contact time and mole ratio of hydrogen to trifluorochloroethylene, and the selection of the specific reaction conditions lead to the attainment of the above objects of the invention, making it possible to produce the desired trifluoroethylene in a yield of higher than 80 mole percent with a conversion of higher than 65 mole percent of the starting trifluorochloroethylene.

According to the process of the present invention a gas-phase mixture of hydrogen and trifluorochloroethylene in a mole ratio of $H_2$ to $CClF=CF_2$ between 0.8:1 and 1.2:1 is passed through a reaction zone to bring the mixture into contact with a catalyst maintained at 200–320° C. for 0.1–4.0 seconds, and the produced trifluoroethylene is recovered from the effluent gas.

Throughout the specification and claims the conversion of the starting trifluorochloroethylene, yield of the desired trifluoroethylene and contact time are determined by the following equations:

Conversion (%) =

$$\frac{\text{Number of moles of starting trifluorochloroethylene fed} - \text{Number of moles of unreacted trifluorochloroethylene}}{\text{Number of moles of trifluorochloroethylene fed}} \times 100$$

Yield (%) =

$$\frac{\text{Number of moles of produced trifluoroethylene}}{\text{Number of moles of starting trifluorochloroethylene fed} - \text{Number of moles of unreacted trifluorochloroethylene}} \times 100$$

$$\text{Contact time (sec.)} = \frac{V}{M \times 22.4 \times \frac{273+t}{273} \times \frac{1}{P}}$$

wherein V=Apparent volume (liter) of catalyst bed in the reactor, M=total moles of hydrogen and trifluorochloroethylene fed per second, P=reaction pressure (absolute atmosphere pressure), $t$=reaction temperature (° C.).

One of the important factors of the process of the invention is the reaction temperature. It is essential in the invention to maintain a temperature of a catalyst bed throughout the reaction at 200 to 320° C. When a temperature higher than 320° C. is applied, formation of unwanted byproducts increases and yield of the desired trifluoroethylene decreases, and at a temperature lower than 200° C. conversion of the organic starting compound falls off. Preferred reaction temperature is in the range of 240 to 300° C.

Another important factor of the invention is the contact time. It is necessary in the invention to cause the hydrogen-trifluorochloroethylene mixture to contact the catalyst for 0.1–4.0 seconds. Longer contact time should be avoided, because formation of undesired trifluoroethane increases and production of the desired trifluoroethylene falls off, and at a shorter contact time conversion of the starting trifluoroethylene decreases. The preferred contact time may be determined in accordance with the reaction temperature applied. For example, a contact time of 1 to 4 seconds is preferable at a 200 to 260° C. reaction temperature and 0.4 to 3 seconds preferable at a 260 to 320° C. reaction temperature.

A further important factor in the process of the invention is to regulate molecular proportions of hydrogen to trifluorochloroethylene to the range of 0.8–1.2 moles of hydrogen to one mole of trifluorochloroethylene. If less than 0.8 mole of hydrogen per mole of trifluorochloroethylene is used, conversion of the starting organic compound is reduced, and if hydrogen is used in a quantity of more than 1.2 moles per mole of trifluorochloroethylene, the unreacted hydrogen used in excess can not be recovered without complicated procedures and, in addition to that, the formation of the undesired trifluoroethane increases and the yield of the desired product is reduced. Preferred molecular proportions of hydrogen to trifluorochloroethylene are in the range of 0.90–1.1 moles of hydrogen per mole of trifluorochloroethylene.

The reaction pressure is not critical in the invention and increased, normal atmospheric or reduced pressure may be applied, but 0.5–5 atmospheric pressures are preferable.

Palladium or platinum on carriers such as activated carbon or activated alumina can be used as the catalyst according to the invention. The preferred catalyst is a palladium on activated carbon. Such catalysts may be prepared by conventional methods, for example, by mixing hydrochloric acid solution of palladium chloride or $H_2PtCl_6$ with activated carbon or alumina, further mixing reducing agents such as formaldehyde as required, then filtering the mixture, drying the residue in vacuum and finally reducing palladium chloride or $H_2PtCl_6$ with hydrogen at 150 to 500° C. to metallic palladium or metallic platinum. Preferred proportions of catalytic metal component and carrier are in the range of 0.2 to 7 weight percent of metal component, based on the combined weight of the metal and carrier.

A tubular reactor of hard glass, quartz, stainless-steel, etc. provided with means for maintaining the catalyst bed in the reactor and inlets for introduction of hydrogen and vaporous trifluorochloroethylene in controlled proportions and outlets for the reaction products is preferably used according to the invention. Said reactor may be heated by conventional heating device, such as electric furnace etc., and connected to a conventional purification and product recovery system.

The reaction products and unreacted trifluorochloroethylene may be recovered and isolated by conventional methods. For example, the effluent gas from the reactor is passed through water to remove hydrogen chloride, and then passed through an aqueous solution of sodium hydroxide to remove traces of hydrogen chloride. Thereafter the gas is dried with anhydrous calcium surfate and introduced into a cold trap, cooled by a mixture of Dry Ice and methanol, to remove unreacted hydrogen.

$CHF=CF_2$ $CH_2FCHF_2$ and unreacted $CClF=CF_2$ are isolated and recovered by fractional distillation of the cold trap condensate.

EXAMPLE 1

A tubular quartz reactor of 19 mm. in diameter and 400 mm. in length was charged with 14.2 ml. of catalyst and the reactor was placed in electric furnace by which the catalyst bed was heated and maintained through the run at a temperature specified in Table 1 below. The catalyst was palladium on activated carbon of 6–14 mesh and contained 5 weight percent of palladium. $CClF=CF_2$ was vaporized and vaporous $CClF=CF_2$ and hydrogen were simultaneously introduced into the reactor through inlets respectively. The mole ratio of $H_2$ to $CClF=CF_2$ was about 1:1, the pressure in the reactor was 1 atmospheric pressure and the contact time is shown in Table 1 below. The effluent gas from the reactor was passed through water and an aqueous solution of sodium hydroxide to remove hydrogen chloride contained therein, and dried with anhydrous calcium sulfate. The dried gas stream was then passed through the cold trap, cooled by a Dry Ice-methanol mixture to remove hydrogen, and fractional distillation of the cold trap condensate gave the results shown in Table 1 below.

TABLE 1

| Run No. | Reaction temp. (° C.) | Contact time (sec.) | Conversion (mol percent) $CClF=CF_2$ | Yield (mol percent) $CHF=CF_2$ | $CH_2FCHF_2$ | Others |
|---|---|---|---|---|---|---|
| 1 | 175 | 2.0 | 31.4 | 88.6 | | |
| 2 | 175 | 8.0 | 55.2 | 79.7 | 11.2 | 9.1 |
| 3 | 175 | 15.0 | 68.5 | 70.2 | | |
| 4 | 210 | 1.0 | 68.9 | 89.8 | 6.2 | 4.0 |
| 5 | 210 | 2.0 | 70.3 | 86.2 | 7.6 | 6.2 |
| 6 | 210 | 4.0 | 72.1 | 83.4 | 11.7 | 4.9 |
| 7 | 250 | 0.4 | 67.8 | 94.1 | 3.1 | 2.8 |
| 8 | 250 | 1.0 | 75.4 | 87.6 | 12.4 | 0.0 |
| 9 | 250 | 2.0 | 82.2 | 84.6 | 12.3 | 3.1 |
| 10 | 250 | 4.0 | 83.6 | 80.0 | 14.4 | 5.6 |
| 11 | 280 | 0.4 | 70.3 | 95.7 | 2.5 | 1.8 |
| 12 | 280 | 1.0 | 82.7 | 91.2 | 5.7 | 3.1 |
| 13 | 280 | 2.0 | 86.2 | 85.8 | 10.6 | 3.6 |
| 14 | 320 | 0.4 | 79.6 | 91.1 | 0.9 | 8.0 |
| 15 | 320 | 2.0 | 87.3 | 74.7 | 13.8 | 11.5 |
| 16 | 350 | 0.4 | 87.4 | 66.5 | 8.3 | 25.2 |
| 17 | 350 | 1.0 | 88.8 | 45.2 | | |

EXAMPLE 2

Nine runs were carried out in the same manner as in Example 1 except that 3.84 weight percent of palladium on activated carbon of 6–14 mesh was mixed with activated alumina of 8–14 mesh in a volume ratio of 1:2 and 50.4 ml. of the mixture was used as a catalyst in the place of that of Example 1, and the results are shown in Table 2 below.

TABLE 2

| Run No. | Reaction temp. (° C.) | Contact time (sec.) | Conversion (mol percent) $CClF=CF_2$ | Yield (mol percent) $CHF=CF_2$ | $CH_2FCHF_2$ | Others |
|---|---|---|---|---|---|---|
| 18 | 240 | 0.4 | 73.5 | 91.6 | 6.6 | 1.8 |
| 19 | 240 | 1.0 | 85.0 | 90.5 | 5.9 | 3.6 |
| 20 | 240 | 1.9 | 76.6 | 89.4 | 5.5 | 5.1 |
| 21 | 240 | 3.0 | 79.1 | 82.7 | 9.6 | 7.7 |
| 22 | 240 | 10.0 | 85.6 | 62.2 | 16.1 | 21.7 |
| 23 | 300 | 0.5 | 74.2 | 94.3 | 1.7 | 4.0 |
| 24 | 300 | 1.3 | 83.4 | 92.2 | 1.6 | 6.2 |
| 25 | 300 | 3.0 | 89.1 | 80.6 | 10.1 | 9.3 |
| 26 | 300 | 6.0 | 90.7 | 63.3 | 14.7 | 22.0 |

EXAMPLE 3

The following runs were carried out in the same manner as in Example 1 except that the catalyst bed was maintained at 250° C. and mole ratio of hydrogen to $CClF=CF_2$ was varied as shown in Table 3 below using a contact time of 1.3 seconds. For comparison, the conversion and yield obtained when the reaction was carried out at 100° C. using a contact time of 15 seconds are shown as Run No. 35 in the Table 3.

TABLE 3

| Run No. | React. Temp. (° C.) | Mol ratio $H_2$ to $CClF=CF_2$ | Contact time (sec.) | Conversion (mol percent) $CClF=CF_2$ | Yield (mol percent) | | |
|---|---|---|---|---|---|---|---|
| | | | | | $CHF=CF_2$ | $CH_2FCHF_2$ | Others |
| 27 | 250 | 0.5:1 | 1.3 | 43.3 | 88.1 | 4.1 | 7.8 |
| 28 | 250 | 0.7:1 | 1.3 | 63.6 | 89.6 | 4.7 | 5.7 |
| 29 | 250 | 0.8:1 | 1.3 | 71.0 | 88.9 | 5.5 | 5.6 |
| 30 | 250 | 0.9:1 | 1.3 | 77.3 | 88.4 | 4.0 | 7.6 |
| 31 | 250 | 1:1 | 1.3 | 79.8 | 89.2 | 5.4 | 5.4 |
| 32 | 250 | 1.1:1 | 1.3 | 82.2 | 88.0 | 6.0 | 6.0 |
| 33 | 250 | 1.2:1 | 1.3 | 85.3 | 80.0 | 12.4 | 7.6 |
| 34 | 250 | 1.5:1 | 1.3 | 86.8 | 60.3 | 31.9 | 7.8 |
| 35 | 100 | 0.7:1 | 15 | 51.8 | 67.4 | 20.3 | 12.3 |

EXAMPLE 4

The reaction was carried out in the same manner as in Example 1 except that 24.2 ml. of catalyst (2.68 weight percent of platinum on activated carbon of 6–14 mesh) was used and a 230° C. reaction temperature and 3.15 seconds contact time were applied. Conversion of $CClF=CF_2$ was 70.9 mole percent and yield of $CHF=CF_2$ was 81.8 mole percent, $CH_2FCHF_2$ was 5.7 mole percent.

EXAMPLE 5

The reaction was carried out in the same manner as in Example 1 except that 41.2 ml. catalyst (1 weight percent of palladium on activated carbon of 6–14 mesh) was used and a 210° C. reaction temperature and 1.3 second contact time were applied. The conversion of $$CClF_2=CF_2$$

was 70.9 mole percent and the yield of $CHF=CF_2$ was 81.8 mole percent and of $CH_2FCHF_2$ was 5.7 mole percent.

What I claim is.

1. A process for manufacturing trifluoroethylene from trifluorochloroethylene, which comprises introducing a gas-phase mixture of hydrogen and trifluorochloroethylene in a mole ratio of $H_2$ to $CClF=CF_2$ between 0.8:1 and 1.2:1 into a reaction zone to bring the mixture into contact with a metallic palladium or platinum on activated carbon or alumina catalyst maintained at 200 to 320° C. for 0.1 to 4.0 seconds, and recovering $CHF=CF_2$ from the resulting reaction products.

2. The process for manufacturing trifluoroethylene trifluorochloroethylene according to claim 1, in which said reaction temperature is in the range of 240° to 300° C.

3. The process for manufacturing trifluoroethylene from trifluorochloroethylene according to claim 1, in which said reaction temperature is in the range of 200° C. to 260° C. and said contact time is in the range of 1 to 4 seconds.

4. The process for manufacturing trifluoroethylene from trifluorochloroethylene according to claim 1, in which said reaction temperature is in the range of 260° C. to 320° C. and said contact time is in the range of 0.4 to 3 seconds.

5. The process for manufacturing trifluoroethylene from trifluorochloroethylene according to claim 1, in which said hydrogen is used in the range of 0.9–1.1 moles per mole of trifluorochloroethylene.

References Cited

UNITED STATES PATENTS

| 2,802,887 | 8/1957 | Miller et al. | 260—653.5 |
| 2,942,036 | 6/1960 | Smith et al. | 260—653.3 |
| 3,043,889 | 7/1962 | Smith et al. | 260—653.3 |

FOREIGN PATENTS

| 655,397 | 1/1963 | Canada | 260—653.5 |

DANIEL D. HORWITZ, Primary Examiner